2,857,279

ART OF STABILIZING MALT BEVERAGE

Mortimer W. Brenner, Hartsdale, N. Y., assignor to Brewing Industries Research Institute, Chicago, Ill., a corporation of Illinois No Drawing. Application October 11, 1956
Serial No. 615,235

1 Claim. (Cl. 99—48)

The present invention is concerned with further improvements in the manner of eliminating of gushing or overfoaming of malt beverage, more especially of fermented malt beverage such as beer and ale, in addition to that disclosed in my U. S. Patent No. 2,763,554, issued September 18, 1956.

As was fully disclosed in the patent cited above, the brewing industry has been plagued for decades with this problem of overfoaming or gushing, which occurs when the consumer package (bottle or can) is opened, even though it has been properly cooled, and not subjected to agitation immediately prior to opening. That patent revealed that the phenomenon of gushing is chiefly due to the presence or formation in the package brew of a significant amount of calium oxalate in microcrystalline or amorphous, sandy or protein-like form, which present a relatively tremendous number of points and amount of surface which offers abundant nuclei for quick release of dissolved gases upon opening the bottle or can in which the beverage is sealed.

It is among the objects of the present invention to provide a malt beverage including fermented malt beverages such as beer and ale in which the difficulty of gushing upon opening the bottle or can containing the beverage is effectively avoided without substantial regard to the conditions to which the packaged beverage is exposed or subjected prior to opening.

According to this present invention in its most general aspect, the soluble oxalate or oxalic acid present in the brewing materials is precluded from forming insoluble microcrystalline or amorphous precipitates in the packaged beverage by removing from the malt beverage during processing such a large proportion, two-thirds or more, of calcium and/or other metallic ions which might otherwise later form an insoluble precipitate of metallic oxalate. This is done by passage of the fermented beer, preferably after prefiltration to remove suspended yeast and other such solids, through a bed of a cation exchange resin preferably in the sodium, potassium, or magnesium form. If this cation exchange resin is treated with a proper buffer solution prior to use in treatment of the beer, then the beer may be so treated that a large part of all of the calcium, iron, manganese, and other metallic ions which might form insoluble precipitates of metallic oxalates are removed from the malt beverage by the cation exchange resin, with the corresponding substitution of innocuous metallic ions, such as sodium, potassium, hydrogen, magnesium or others. In the finished packaged beer, treated in accordance with my invention, the concentration of metallic ions other than hydrogen, sodium, potassium, magnesium and/or aluminum is advantageously less than 10 p. p. m.

The same treatment might be carried out in a batch process, but the known superiority, primarily from economic reasons and for saving of time, of the so-called column techniques make these latter preferable.

As has been disclosed previously, the addition of any metallic ions which might result in the formation of insoluble precipitates of metallic oxalates during the final finishing processes usually applied to malt beverages, such as the final filtration, are to be avoided. Such addition might be accidental, as by use of a filtration medium containing a significant amount of soluble salts, such as those of calcium, iron, manganese, bismuth, zinc, or others which might form precipitates of insoluble metal oxalates.

The efficacy of the process above set forth may be checked and assured with the desired factor of safety by the process set forth in my patent, above referred to, or it may be done by analytical measurements of the amount of the several metallic ions still remaining in the finished brew after processing which have the ability to form precipitates of insoluble oxalate.

While the foregoing specification is believed fully to set forth the invention, a few specific examples follow in order to assure compliance with statutory requirements.

*Example 1*

During the transfer of beer from primary storage to secondary storage, during which the beverage is customarily filtered or treated in some manner so as to effect the separation of suspended matter and/or organisms, the malt beverage is passed through a tank containing a bed of cation exchange resin, such as Dowex-50, which has been previously buffered to a pH approximating that of the beer. Illustratively, the Dowex-50 resin has been treated with a solution of sodium acetate and acetic acid containing a total of 10% of both solutes prior to this use.

*Example 2*

As the fermented malt beverage is ready for final filtration, it is passed through a bed of cation exchange resin such as Amberlite IRC-50 which has been put into the potassium form by prior treatment. During the passage of the beer through this bed of resin in potassium form, the metallic ions which are undesirable in a beer which is to remain stable against the possibility of overfoaming or gushing are trapped by the resin, which substitutes potassium ions in solution for those which have been bound by the resin. The beer passes on through the normal filtration cycle.

What is claimed as new is:

In a method of preventing the gushing of packaged beer, the steps which comprise providing a bed of cation exchange resin buffered to a pH approximating that of beer and operating in the sodium, potassium or magnesium cycle, passing the beer through said bed to remove at least two-thirds of the calcium, iron and manganese from said beer, and to reduce the concentration of metallic ions other than hydrogen, sodium, potassium, magnesium and aluminum to less than 10 p. p. m., and then packaging said beer.

References Cited in the file of this patent

UNITED STATES PATENTS

| | | |
|---|---|---|
| 2,128,432 | Ramage | Aug. 30, 1938 |
| 2,291,624 | Heimann et al. | Aug. 4, 1942 |
| 2,500,171 | Gause | Mar. 14, 1950 |
| 2,520,189 | Zarow | Aug. 29, 1950 |
| 2,548,594 | Edmonds | Apr. 10, 1951 |
| 2,600,085 | Van Dyke | June 10, 1952 |
| 2,667,417 | Delmousee et al. | Jan. 26, 1954 |
| 2,711,963 | Gray | June 28, 1955 |
| 2,745,747 | Hennig | May 15, 1956 |
| 2,748,002 | Kneen | May 29, 1956 |
| 2,763,554 | Brenner | Sept. 18, 1956 |